United States Patent [19]

Todoriki et al.

[11] Patent Number: 5,667,551

[45] Date of Patent: Sep. 16, 1997

[54] SECONDARY AIR HUMIDITY CONTROLLER FOR A GLASS MELTING FURNACE AND GLASS MELTING FURNACE WITH THE CONTROLLER

[75] Inventors: Hiroshi Todoriki, Yokohama; Ichiro Terao, Funabashi, both of Japan

[73] Assignee: Asahi Glass Company Ltd., Tokyo, Japan

[21] Appl. No.: 615,952

[22] Filed: Mar. 14, 1996

[30] Foreign Application Priority Data

Mar. 30, 1995 [JP] Japan .................................. 7-073629

[51] Int. Cl.$^6$ ........................................... C03B 5/24
[52] U.S. Cl. .......................... 65/160; 65/29.12; 65/29.13
[58] Field of Search ......................... 65/29.12, 29.13, 65/134.6, 160, 161; 431/89

[56] References Cited

U.S. PATENT DOCUMENTS

| | | | |
|---|---|---|---|
| 4,292,064 | 9/1981 | Propster | 65/27 |
| 4,298,369 | 11/1981 | Froberg et al. | 65/27 |
| 4,298,372 | 11/1981 | Stover et al. | 65/136 |
| 4,375,368 | 3/1983 | Stevenson | 65/29 |
| 4,407,669 | 10/1983 | Nelson | 65/134 |
| 5,310,335 | 5/1994 | Van Berkum | 431/12 |
| 5,401,162 | 3/1995 | Bonne | 431/12 |

FOREIGN PATENT DOCUMENTS

| | | |
|---|---|---|
| 62-261659 | 11/1987 | Japan . |
| 2103511 | 2/1983 | United Kingdom . |
| 2270091 | 2/1994 | United Kingdom . |

*Primary Examiner*—Donald E. Czaja
*Assistant Examiner*—Sean Vincent
*Attorney, Agent, or Firm*—Oblon, Spivak, McClelland, Maier & Neustadt, P.C.

[57] ABSTRACT

A secondary air humidity controller comprising a humidity sensor which detects a humidity in secondary air for combustion in a glass melting furnace; and a humidifier which is arranged upstream of the humidity sensor, and which supplies moisture to the secondary air so that an output from the humidity sensor reaches a predetermined value.

3 Claims, 2 Drawing Sheets

SECONDARY AIR HUMIDITY CONTROLLER FOR A GLASS MELTING FURNACE AND GLASS MELTING FURNACE WITH THE CONTROLLER

BACKGROUND OF THE INVENTION

1. Field of the Invention

The present invention relates to a secondary air humidity controller for a melting furnace for manufacturing glass.

2. Discussion of Background

In a melting furnace with a regenerator used for manufacturing glass, flue gas is passed through the regenerator to have heat storage refractory bricks absorbed heat. When the burning direction changes after that, secondary air for combustion is passed through the regenerator at a high temperature to carry out preheating the secondary air and waste heat recovery.

In order to keep the quality of glass articles manufactured by the melting furnace at a high level, the operating conditions of the melting furnace are desired to be stable. There are various factors which are an obstacle to a stable operation and vary the operating conditions of the melting furnace. One of the factors is a change in the temperature (blowing temperature) of the secondary air for combustion which is blown into the melting furnace.

The factor in variation in the blowing temperature has been considered to be a change in the temperature of the atmosphere. The temperature of the secondary air at the inlet of the regenerator changes principally in proportion to the temperature of the atmosphere, resulting in a change in the blowing temperature. There has been known a measure which uses hot air passed through a heat exchanger and controls the mixing rate of the hot air and the atmosphere to regulate the temperature of the secondary air at the inlet of the regenerator at a constant level so as to make the blowing temperature stable in order to prevent the blowing temperature from varying due to a change in the temperature of the atmosphere.

However, the inventors have recently found that a change in the humidity of the atmosphere as well as a change in the temperature of the atmosphere can have effect on the temperature in the melting furnace in some cases. This phenomenon has been found based on discovering that the temperature in the melting furnace goes up when it rains. It is an undesirable phenomenon because of an obstacle to the stable operation of the melting furnace.

The results of thorough investigation showed that the variation in the blowing temperature due to a change in the atmospheric humidity had a range of variation as high as 10° C. in a melting furnace having about 200 t/day of throughput of glass melt, depending on a change in the humidity which varies on a day.

Although the mechanism of the effect which the change in the humidity has on a melting tank is not clear, it is presumed as follows: Heat transfer from the hot refractory bricks to the secondary air for heating the secondary air in the regenerator is carried out mainly by convective heat transfer due to contact. Because most of the heat storage refractory bricks have a high temperature beyond 1000° C., it is presumed that the heat transfer varies as the radiation of steam varies together with the concentration of the steam.

Specifically, it is presumed that a high concentration of $H_2O$ causes heat transfer from the heat storage refractory bricks to the secondary air due to radiation to increase, and a low concentration of $H_2O$ causes heat transfer due to radiation to decrease, resulting in a change in the temperature of the secondary air which has passed through the regenerator. Although the atmosphere contains $CO_2$ as other radiative components, $CO_2$ can not be one of the factors in variation in the secondary air temperature because $CO_2$ has small variation unlike steam.

SUMMARY OF THE INVENTION

It is an object of the present invention to prevent a minute but harmful change in the temperature in a melting furnace which is caused by a change in the atmosphere humidity which has not been clarified and which has been required to be solved.

The present invention has been provided to solve the problem stated earlier, and provides a secondary air humidity controller comprising a humidity sensor which detects a humidity in secondary air for combustion in a glass melting furnace; and a humidifier which is arranged upstream of the humidity sensor, and which supplies moisture to the secondary air so that an output from the humidity sensor reaches a predetermined value.

In the present invention, it is preferable that the humidity sensor is arranged at a side portion in a duct for supplying the secondary air, and that the humidifier is arranged at a side portion in the duct upstream of the humidity sensor.

It is preferable that the humidifier is controlled so that the output from the humidity sensor indicates an absolute humidity of 5–25 $g/Nm^3$ in order to control radiant heat due to moisture so as to stabilize the variation in the secondary air temperature. 1 $Nm^3$ means a volume of 1 $m^3$ in the normal state. In particular, it is preferable that in winter in Japan having a low temperature and a low humidity in external air and in the case of external air having such conditions the humidifier is controlled so that the absolute humidity reaches about 5–10 $g/Nm^3$. It is preferable that in spring or autumn in Japan and in the case of external air having the conditions like spring or autumn, the humidifier is controlled so that the absolute humidity reaches about 10–20 $g/Nm^3$. It is preferable that in summer in Japan having a high temperature and a high humidity in external air and in the case of external air having such conditions, the humidifier is controlled so that the absolute humidity reaches about 20–25 $g/Nm^3$.

The present invention also provides a glass melting furnace including the secondary air humidity controller. The glass melting furnace with the secondary air humidity controller can eventually stabilize the variation in the secondary air temperature to obtain a stable operation in the melting furnace, offering advantages in that a decrease in fuel saves energy, and that the stable operation minimizes a defect in glass melt.

In the present invention, it is preferable that the glass melting furnace is provided with a regenerator to heat the secondary air before combustion. The present invention may use a recuperative glass melting furnace wherein the secondary air is heated by a heat exchanger through the furnace is not provided with a regenerator. The present invention may use a glass melting furnace which provided with both a regenerator and a heat exchanger.

In the secondary air humidity controller according to the present invention, it is preferable that the humidifier is arranged in a duct for supplying secondary air, and that the humidity sensor is arranged in the duct downstream of the humidifier to carry out a feedback control for humidification. Other structures or manners may be used to control the humidification.

With respect to the humidifier, it is preferable that steam is spouted out of a nozzle because if the amount of the secondary air is great, much amount of humidification is required. Other devices may be used as long as they have a sufficient humidification capacity.

The position where the humidity sensor is arranged is desired to be determined so that the moisture added by the humidifier is sufficiently mixed with the secondary air to obtain an equal humidity. Although it is the best that a desired humidity is set in an absolute humidity, it may be set in a relative humidity if the temperature of the secondary air is controlled to be at a constant value.

If compensating variables in the atmospheric humidity is aimed, it is the best that an absolute humidity which is set as the desired humidity is not changed throughout the year. The desired humidity may be set at about 25 $g/Nm^3$ to zero-in on rainy weather in Japanese midsummer with the highest humidity. In this case, it is required that the controlling limits for the humidity be wide and that the humidifier have a sufficient capacity because the absolute humidity is about 1 $g/Nm^3$ under weather conditions with the lowest humidity in Japanese winter. For example, if the flow rate of the secondary air is 15000 $Nm^3/h$, the humidification capacity is required to be 15000×25=375 kg/h.

The absolute humidity as the desired humidity may be preferably changed depending on seasons or other factors in e.g. a case wherein the humidifier has a limited capacity to be unable to attain the desired humidity, or a case wherein the temperature of the secondary air is so low as to cause condensation in the duct. In this case, the minimum requirements are that the controlled variable for the humidity can be set so as to compensate about 5–7 $g/Nm^3$ as a difference between rainy weather and shiny weather. It is required that at least 5 $g/Nm^3$ of humidity control, preferably more than about 10 $g/Nm^3$ of humidity control be capable. For example, if the flow rate of the secondary air is 15000 $Nm^3/h$, the humidity capacity is required to be 15000×10= 150 kg/h.

The secondary air humidity controller according to the present invention is widely applicable to not only constant-value control for compensating variables in the atmospheric humidity but also other control e.g. for aiming at saving energy by improving waste heat recovery efficiency in the regenerator, or for regulating sensible heat carried by pre-heated secondary air to carry out the temperature control in the melting furnace.

In accordance with the present invention, when $H_2O$ molecules added into the secondary air pass through a secondary air warmer such as the regenerator and the heat exchanger or through a secondary air passage at a high temperature, the molecules are forced to receive radiative heat transfer from the heat storage refractory bricks, the wall surfaces in the heat exchanger or the wall surface in the hot secondary air passage which have been heated to higher than 1000° C. This is because the molecules are radiative components. The concentration of $H_2O$ in the secondary air can be regulated at a constant value to make radiative heat transfer quantity constant, preventing the blowing temperature from being variable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Now, the present invention will be described in detail with reference to a preferred embodiment illustrated in the accompanying drawings.

Figure 1:
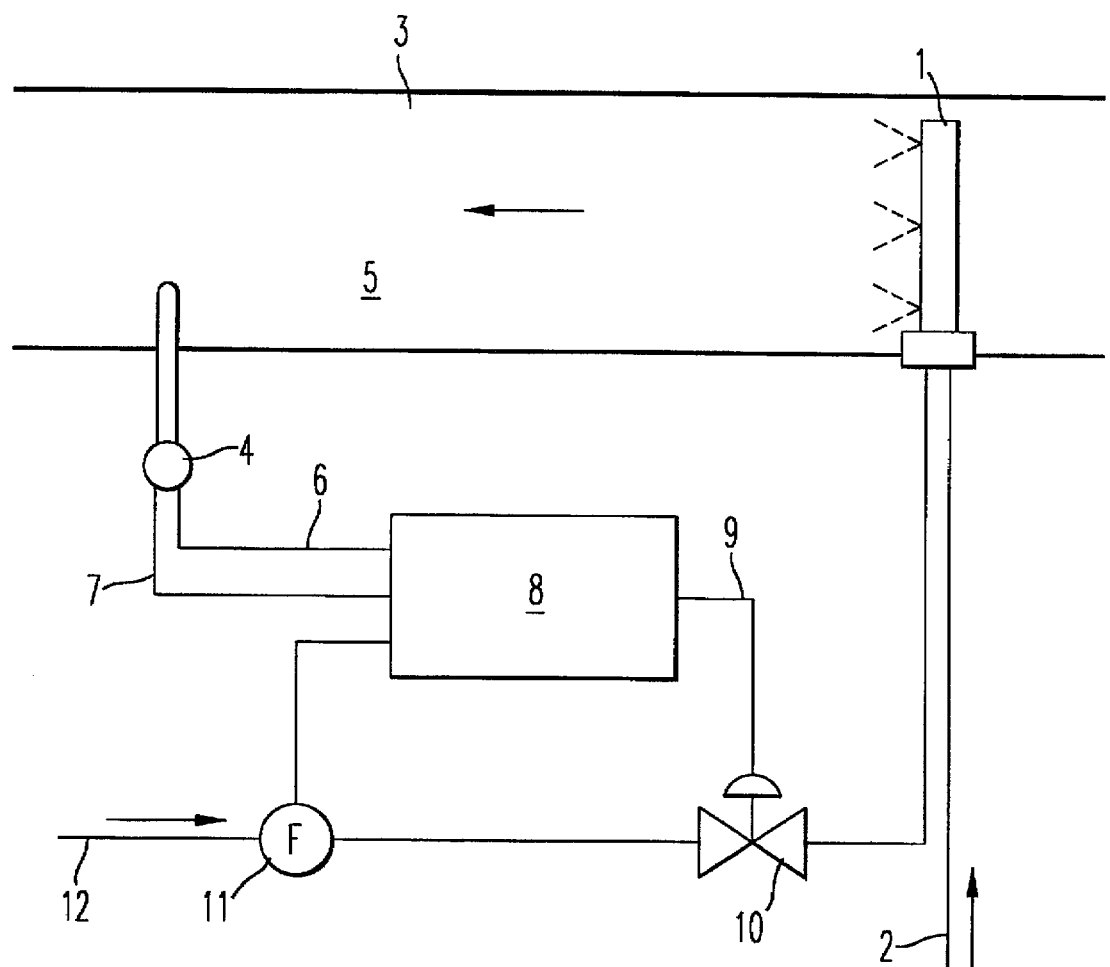
FIG. 1 is a block diagram of an embodiment of the secondary air humidity controller according to the present invention.

In FIG. 1, there is shown a block diagram of the schematic structure of an embodiment of the secondary air humidity controller according to the present invention. In FIG. 1, reference numeral 1 designates a nozzle type of humidifier which is of a steam spouting type, and which has a pipe 2 for heat retaining steam clung thereto in order to prevent a drain from being produced due to cooling. The humidifier 1 has a nozzle portion inserted into a secondary-air duct 3 through a side wall portion of the duct to carry out humidification to secondary air 5.

A temperature and humidity sensor 4 is arranged at a side wall portion of the duct far downstream (about 15 m downstream) of the humidifier 1 because it is preferable that the sensor detects a humidity in such a state that the steam from the humidifier is sufficiently mixed with the secondary air 5 to be equalized. The sensor provides a humidity output 6 which is represented in a relative humidity. The humidity output is input into an indicating controller 8 together with a temperature output 7 from the sensor, and is converted into an absolute humidity.

The indicating controller 8 calculates a deviation between the obtained absolute humidity and a desired value to determine a controlled variable 9, which is output to a steam regulating valve 10. The indicating controller 8 has a system to give an alarm when the deviation between the actual value and the desired value with respect to the humidity is beyond a predetermined level or when the value indicated by a steam flowmeter 11 is beyond a reference value. The steam regulating valve 10 adjusts valve setting based on a signal from the indicating controller 8 to change the flow rate of humidification steam 12.

Figure 2:
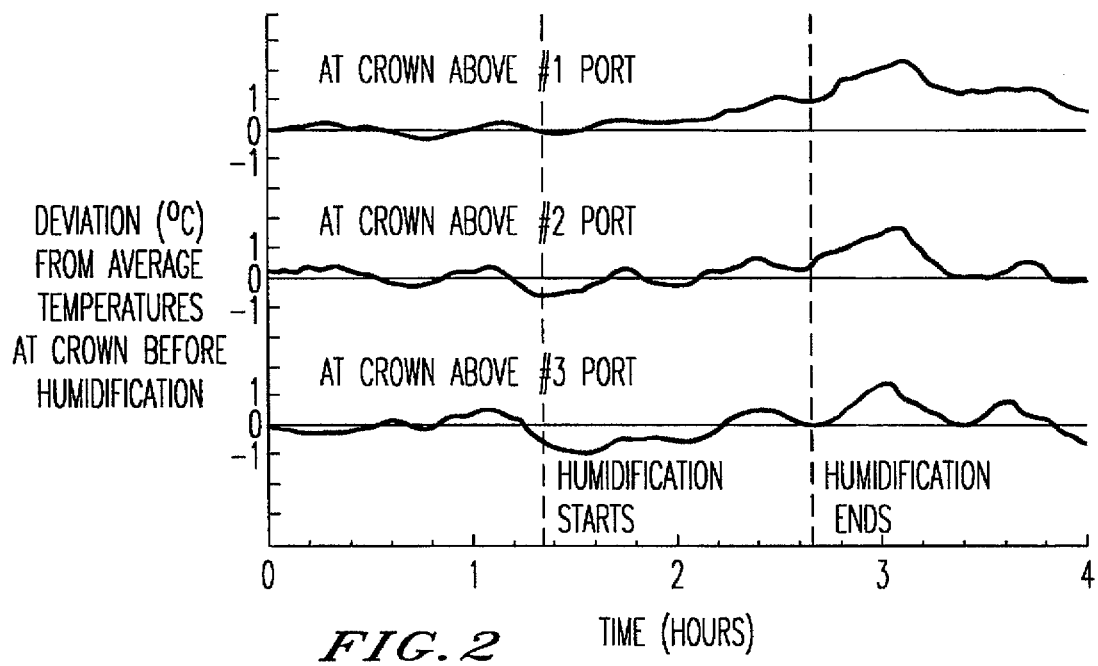
FIG. 2 is a graph showing changes in the temperature at a crown in a glass melting furnace by humidifying secondary air in accordance with the embodiment.

In FIG. 2, there is shown changes in the temperature at a crown of a melting furnace, which were measured when the humidity of the secondary air is changed by stepwise humidification. The changes in the temperature at the crown are represented by changes in the temperatures, which were measured at upper portions above three fuel oil burners (#1–#3 ports) in the glass melting furnace. In FIG. 2, the horizontal axis is time (in hours), and the vertical axis is deviation from the average temperature before humidification (in °C).

In this embodiment, the measurement was made estimating a difference between the humidity on a rainy weather and that on a shinny weather. Setting the humidity is made at the same level as the range of variation due to weather conditions. It is shown that the temperature at the crown went up together with commencement of humidification, and that it reached the maximum value in about 30 minutes after completion of humidification, and then went down. The time lag of 30 minutes is a time which was required for heat transfer in the refractory bricks from the back of the crown to thermocouples. The humidification and the crown temperature actually start to rise at the same timing.

Although the increase in the temperature was about 2° C., it is presumed that the crown temperature would have further rised if the humidification was continued because no equilibrium had been reached.

Figure 3:
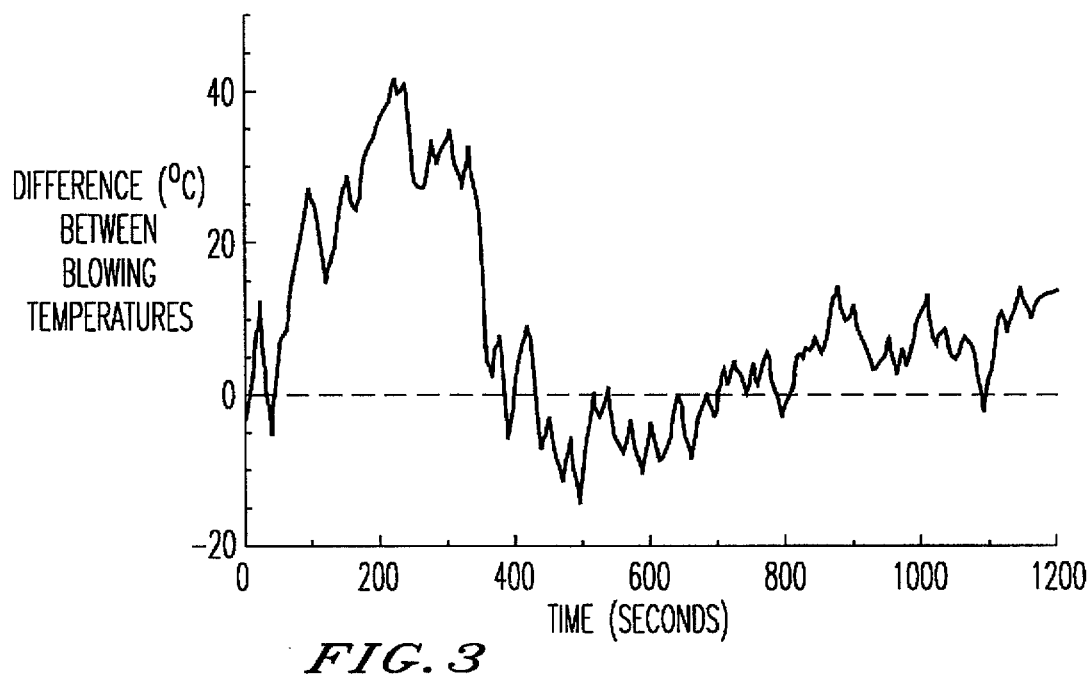
FIG. 3 is a graph showing changes in the blowing temperature of the secondary air by secondary air humidification in accordance with the embodiment.

In FIG. 3, there is shown a graph wherein the blowing temperature at an upper end of the regenerator was measured by a suction pyrometer under the humidification conditions stated above, and differences in the temperature between before and after humidifying are plotted. The secondary air absolute humidity before humidifying is 1 g/Nm$^3$ and the one after humidifying is 7 g/Nm$^3$. In FIG. 3, the horizontal axis is time (in seconds), and the vertical axis is differences between the blowing temperatures (in °C). Changes with respect to time during one cycle of burning direction change are shown.

The graph shows that the humidification effect was in particular noticeable in an early stage after change of the burning direction as the refractory bricks were at a high temperature at that time, and that the differences became gradually smaller as time passed. It was confirmed that there was a temperature difference 8° C. on the average.

Those results clearly indicate that a change in the atmospheric humidity has great impact on the operating conditions for the melting furnace, and that such variation occurs daily.

The humidity control for the secondary air was carried out in order to compensate a change in the atmospheric humidity in consideration of the stepwise response as stated above. The desired value was set at a constant value of 15 g/Nm$^3$ of secondary air absolute humidity for winter on condition that the desired value is adjusted each season.

As a result, there could be realized an extremely stable operation wherein the change in the crown temperature on a day was below 1° C. when the constant value control was carried out while the change in the crown temperature was 4° C. on the average when the humidity in the secondary air was not controlled. In addition, it was confirmed that the sensible heat that the secondary air carried into the melting furnace was increased by the increased blowing temperature to save fuel oil by 20 l/h on the average.

In accordance with the present invention, the minute and harmful temperature change in a regenerative glass melting furnace which is caused by a change in the atmospheric humidity and which has not been solved can be prevented by control the humidity in the secondary air to make radiant heat due to water molecules constant in the regenerator. This arrangement offers an advantage in that the melting furnace can be stably operated. In addition, there have also been provided advantages in that a decrease in the fuel can save energy and that the stable operation minimizes a defect in glass melt.

Obviously, numerous modifications and variations of the present invention are possible in light of the above teachings. It is therefore to be understood that within the scope of the appended claims, the invention may be practiced otherwise than as specifically described herein.

What is claimed is:

1. A secondary air humidity controller in a glass melting furnace, comprising:

a humidity sensor which detects a humidity in a duct for secondary air for combustion in the glass melting furnace; and a humidifier which is arranged upstream of the humidity sensor in the secondary air flow, and which supplies moisture to the secondary air so that an output from the humidity sensor reaches a predetermined value.

2. A secondary air humidity controller according to claim 1, wherein the humidity sensor is arranged at a side portion in a duct for supplying the secondary air, and wherein the humidifier is arranged at a side portion in the duct upstream of the humidity sensor.

3. A secondary air humidity controller according to claim 1, wherein the humidifier is controlled so that the output from the humidity sensor indicates a substantially constant absolute humidity in a range of 5–25 g/Nm$^3$.

* * * * *